United States Patent
Turchi et al.

(10) Patent No.: US 10,008,924 B1
(45) Date of Patent: Jun. 26, 2018

(54) OFFLINE POWER CONVERTER WITH MULTIPLIER

(71) Applicant: SEMICONDUCTOR COMPONENTS INDUSTRIES, LLC, Phoenix, AZ (US)

(72) Inventors: Joel Turchi, Gagnac sur Garonne (FR); Christophe Basso, Pibrac (FR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days. days.

(21) Appl. No.: 15/624,298

(22) Filed: Jun. 15, 2017

(51) Int. Cl.
*G05F 1/565* (2006.01)
*G05F 1/00* (2006.01)
*H02M 1/00* (2006.01)
*H02M 1/42* (2007.01)
*H02M 7/06* (2006.01)

(52) U.S. Cl.
CPC ........... *H02M 1/4208* (2013.01); *H02M 7/06* (2013.01)

(58) Field of Classification Search
CPC ........ G05F 1/565; H02M 3/156; H02M 7/003
USPC ......... 323/243, 274, 275, 284, 285; 363/147
See application file for complete search history.

(56) References Cited

U.S. PATENT DOCUMENTS

| | | | |
|---|---|---|---|
| 5,359,281 A | 10/1994 | Barrow et al. | |
| 7,893,663 B2 | 2/2011 | Ng | |
| 9,048,752 B2 * | 6/2015 | Capilla | H02M 1/4225 |
| 2002/0089860 A1 * | 7/2002 | Kashima | H02M 3/156 363/13 |
| 2004/0120094 A1 * | 6/2004 | Satoh | H01F 7/18 361/160 |
| 2011/0038188 A1 | 2/2011 | Choi | |

FOREIGN PATENT DOCUMENTS

WO    2011144981 A1    11/2011

OTHER PUBLICATIONS

FAN7930; "Critical Conduction Mode PFC Controller"; Product Data Sheet; Fairchild Semiconductor Corporation; Apr. 2010; 24 pages; FAN7930 Rev 1.0.1; Fairchild Semiconductor Corporation, 1272 Borregas Avenue, Sunnyvale, CA 94089 United States.
(Continued)

*Primary Examiner* — Gary Nash
(74) *Attorney, Agent, or Firm* — Polansky & Associates, P.L.L.C.; Paul J. Polansky

(57) ABSTRACT

An integrated circuit power factor controller includes a feedback input terminal for receiving a feedback signal representative of an output voltage, a control terminal for receiving an error signal and adapted to be coupled to a compensation network, a drive terminal for providing a drive signal and adapted to be coupled to a transistor, and a pulse width modulator. The pulse width modulator is coupled to the feedback input terminal, the control terminal, and the drive terminal, and provides the drive signal having a duty cycle formed in response to the feedback signal. The pulse width modulator includes a line sensing multiplier having a first input for receiving the error signal, a second input for receiving the drive signal, and an output for providing a multiplied signal, and the pulse width modulator further provides the drive signal in response to the multiplied signal.

22 Claims, 8 Drawing Sheets

(56) References Cited

OTHER PUBLICATIONS

UC3854; "High Power Factor Preregulator"; Product Data Sheet; Unitrode Corporation; Mar. 2006; 11 pages; Unitrode Corporation, 7 Continental Blvd., Merrimack, NH 03054 United States.
NCP1653; "Compact, Fixed-Frequency,Continuous Conduction Mode PFC Controller"; Product Data Sheet; Semiconductor Components Industries, LLC; May 2015; 21 pages; NCP1653/D Rev. 10; Semiconductor Components Industries, LLC, P.O. Box 5163, Denver, Colorado 80217 United States.
NCP1650; "Power Factor Controller"; Product Data Sheet; Semiconductor Components Industries, LLC; Mar. 2015; 31 pages; NCP1650/D Rev. 13; Semiconductor Components Industries, LLC, P.O. Box 5163, Denver, Colorado 80217 United States.
NCP1602; "Enhanced, High-Efficiency Power Factor Controller"; Product Data Sheet; Semiconductor Components Industries, LLC; Oct. 2015; 32 pages; NCP1602/D Rev. 0; Semiconductor Components Industries, LLC, P.O. Box 5163, Denver, Colorado 80217 United States.
NCP1250; "Current-Mode PWM Controller for Off-line Power Supplies"; Product Data Sheet; Semiconductor Components Industries, LLC; Apr. 2015; 24 pages; NCP1250/D Rev. 10; Semiconductor Components Industries, LLC, P.O. Box 5163, Denver, Colorado 80217 United States.
MC34262, MC33262 "Power Factor Controllers"; Product Data Sheet; Semiconductor Components Industries, LLC; Apr. 2013; 19 pages; MC34262/D Rev. 14; Semiconductor Components Industries, LLC, P.O. Box 5163, Denver, Colorado 80217 United States.
L6561; "Power Factor Corrector"; Product Data Sheet; STMicroelectronics; Jun. 2004; 13 pages; Rev. 10; STEMicroelectronics, 39, Chemin du Champ des Filles, C. P. 21, CH 1228 Plan-Les-Ouates, Geneva, Switzerland.

\* cited by examiner

OFFLINE POWER CONVERTER WITH MULTIPLIER

CROSS-REFERENCE TO RELATED APPLICATION

Related subject matter is found in a copending patent application entitled "Offline Power Converter with Integral Line Sensing", U.S. patent application Ser. No. 15/623,810 filed Jun. 15, 2017, invented by Joel Turchi and Christophe Basso and assigned to the assignee hereof.

FIELD OF THE DISCLOSURE

The present disclosure relates generally to power conversion circuits, and more particularly to offline converters such as power factor controllers.

BACKGROUND

Offline converters receive a voltage from an alternating current (AC) line and form a bulk voltage, which may then be converted into a different voltage for use by low-voltage circuitry. Typically a full-wave AC input voltage is converted into a half wave rectified voltage and smoothed before being converted into a lower voltage. One particularly useful feature for offline converters is power factor control. A power factor controller may be used in an offline converter to ensure that power is being efficiently delivered to a load with a high power factor by keeping the voltage and current waveforms in phase.

When operating, the power factor controller implements various voltage feed-forward and protection functions based on the level of the input voltage. For example, the power factor controller can sense a low line condition and adjust the on-time of a switch in response. The power factor controller can also detect a brownout condition in which it senses an abnormally low line for an extended time and take appropriate remedial actions. While these feed-forward and protection functions are useful, they use an integrated circuit terminal to sense the line voltage.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
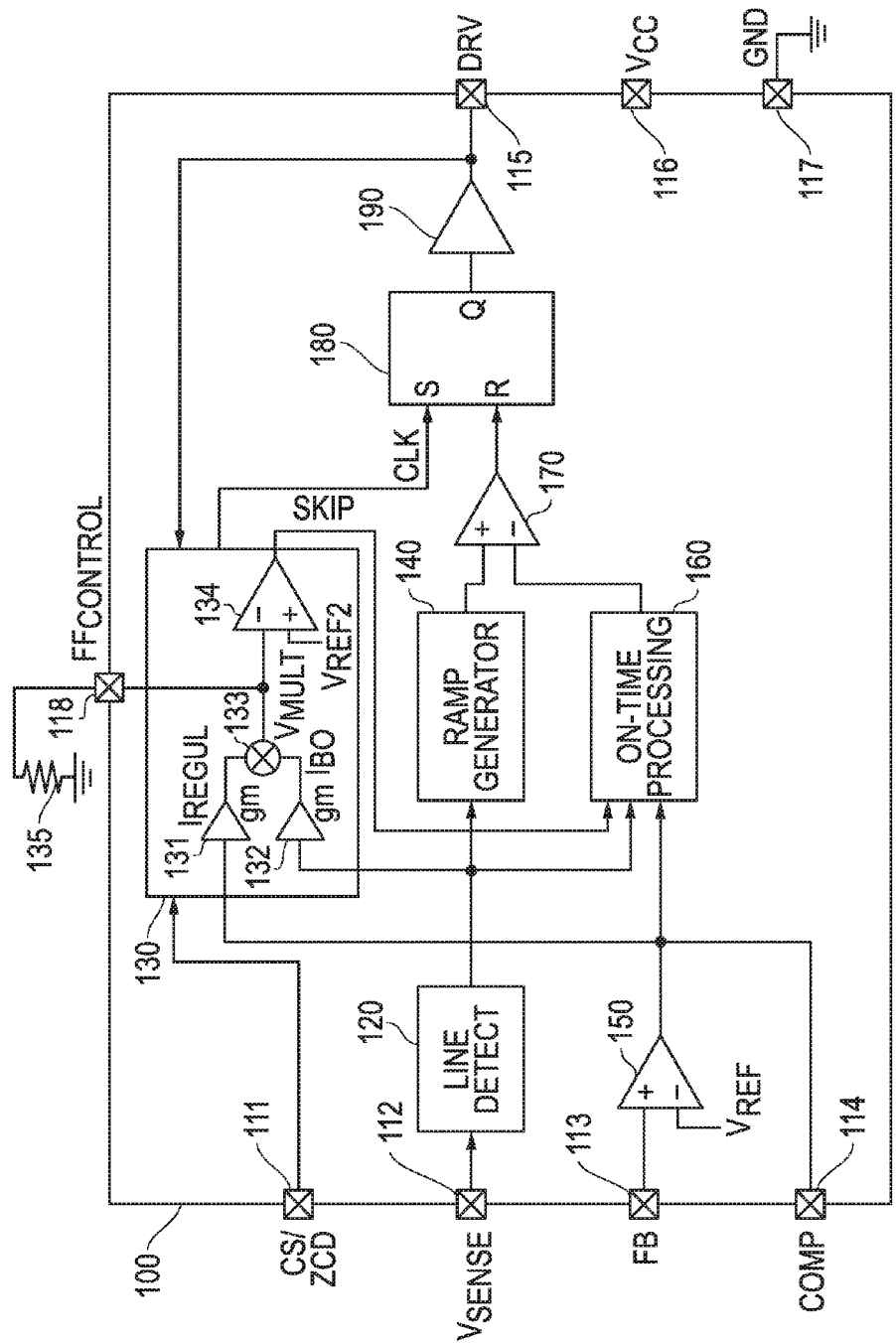
FIG. 1 illustrates in block diagram form an integrated circuit power factor controller known prior art.

FIG. 1 illustrates in block diagram form an integrated circuit power factor controller 100 known prior art. Integrated circuit power factor controller 100 includes a set of integrated circuit terminals 110, a line detect circuit 120, a clock generator with dead-time control circuit 130, a ramp generator 140, an error amplifier 150, an on-time processing circuit 160, a comparator 170, a latch 180, and a buffer 190.

Integrated circuit power factor controller 100 has seven terminals 110, including a current sense/zero current detect terminal 111 labeled "CS/ZCD", a line voltage sense terminal 112 labeled "$V_{SENSE}$", a feedback terminal 113 labeled "FB", a compensation terminal 114 labeled "COMP", a drive terminal 115 labeled "DRV", a positive power supply voltage terminal 116 labeled "$V_{CC}$", a ground terminal 117 labeled "GND", and a feed-forward control terminal 118 labeled "$FF_{CONTROL}$". Line detect circuit 120 has an input connected to line voltage sense terminal 112, and an output. Clock generator with dead-time control circuit 130 has a first input connected to current sense/zero current detect terminal 111, a second input connected to compensation terminal 114, a third input connected to the output of line detect circuit 120, a fourth input, a first output for providing a signal labeled "CLK", a second output for providing a signal labeled "SKIP", and a control terminal connected to feed-forward control terminal 118. Ramp generator 140 has an input connected to the output of line detect circuit 120, and an output. Error amplifier 150 has a non-inverting input connected to feedback terminal 113, an inverting input for receiving a voltage labeled "$V_{REF}$", and an output connected to compensation terminal 114. On-time processing circuit 160 has a first input connected to the second output of clock generator with dead-time control circuit 130, a second input connected to the output of line detect circuit 120, a third input connected to the output of error amplifier 150, and an output. Comparator 170 has a positive input connected to the output of ramp generator 140, a negative input connected to the output of on-time processing circuit 160, and an output. Latch 180 has a set input labeled "S" connected to the first output of dead-time control circuit 130, a reset input labeled "R" connected to the output of comparator 170, and an output labeled "Q". Driver 190 has an input connected to the output of latch 180, and an output connected to the fourth input of clock generator with dead-time control circuit 130 and to drive terminal 115.

Clock generator with dead-time control circuit 130 includes transconductance amplifiers 131 and 132, a multiplier 133, and a comparator 134. Transconductance amplifier 131 has an input connected to compensation terminal 114, and an output for providing a signal labeled "$I_{REGUL}$". Transconductance amplifier 132 has an input connected to compensation terminal 114, and an output for providing a signal labeled "$I_{BO}$". Multiplier 133 has a first terminal connected to the output terminal of transconductance amplifier 131, a second terminal connected to the output terminal of transconductance amplifier 132, and an output terminal connected to feed forward control terminal 118 for providing a signal labeled "$V_{MULT}$". Comparator 134 has a negative input connected to the output of multiplier 133, an positive input for receiving a reference voltage labeled "$V_{REF2}$", and an output for providing the SKIP signal.

In operation, integrated circuit power factor controller 100 is part of an offline converter that modulates the conduction of an external transistor (not shown in FIG. 1) whose gate is connected to drive terminal 115 in order to deliver power to a load with a high power factor. The first terminal of the external transistor receives a smoothed haversine waveform. Integrated circuit power factor controller 100 uses the ripple in the rectified AC line voltage to adjust current sense limits to keep the voltage and current waveforms delivered to the load in phase, as well as for protection from abnormal line conditions.

The offline converter typically generates $V_{SENSE}$ as a fraction of the rectified AC line voltage, and line detect circuit 120 uses $V_{SENSE}$ to detect certain abnormal conditions including low-line and brownout conditions. For example, ramp generator 140 modifies the ramp signal in response to a low line condition, and on-time processing circuit 160 causes the DRV signal to be off in response to a brownout condition.

Clock generator with dead-time control circuit 130 uses the CS/ZCD input to detect a core reset of an external inductor and to provide a current limit protection function. Clock generator with dead-time control circuit 130 uses the CS/ZCD signal as a zero current detect signal to modulate the dead-time of the DRV signal and to selectively generate the CLK signal to latch 180. It uses the CS/ZCD signal as a current sense signal to detect that the current through the external transistor has reached its limit and to cause on-time processing circuit 160 to deactivate the DRV signal in response.

Clock generator with dead-time control circuit 130 also includes a multiplier to perform a skip function selectively based on a product of the error signal and the line voltage. It first converts both the error signal and the line voltage into current signals using respective transconductance amplifiers 131 and 132. External feed forward control resistor 135 converts the multiplied current into a voltage signal $V_{MULT}$. Comparator 134 provides the SKIP signal when $V_{MULT}$ is less than $V_{REF2}$.

Ramp generator 140 provides a ramp signal to its output that is used to set the on-time of the external transistor. Upon detection of a low line condition, it changes the slope of the ramp signal, in which the ramp signal is steeper in high-line conditions than in low-line conditions.

The offline converter generates the FB signal as a fraction of the output voltage. Integrated circuit power factor controller 100 uses error amplifier 150 to develop an error signal proportional to the difference between FB and $V_{REF}$ in order to regulate the output voltage to a desired level. Compensation terminal 114 provides a connection point between the output of error amplifier 150 and an off-chip compensation network that is provided for loop stability. On-time processing circuit 160 combines the error signal, the line sense signal, and information about the state of the transformer to generate an on-time voltage reference level. Comparator 170 uses the on-time reference level and the ramp signal generated by ramp generator 140 to determine the on-time of the external transistor by determining when to reset latch 180. On-time processing circuit also selectively skips cycles in response to $V_{MULT}$.

Integrated circuit power factor controller 100 may include several additional protection mechanisms that are not described here in detail.

While integrated circuit power factor controller 100 achieves high power factor, it requires several external terminals to develop that various signals to control its operation. As will now be described, the inventors have developed a way to provide the same function but to reduce the terminal count, thus reducing the cost of the offline converter.

Figure 2:
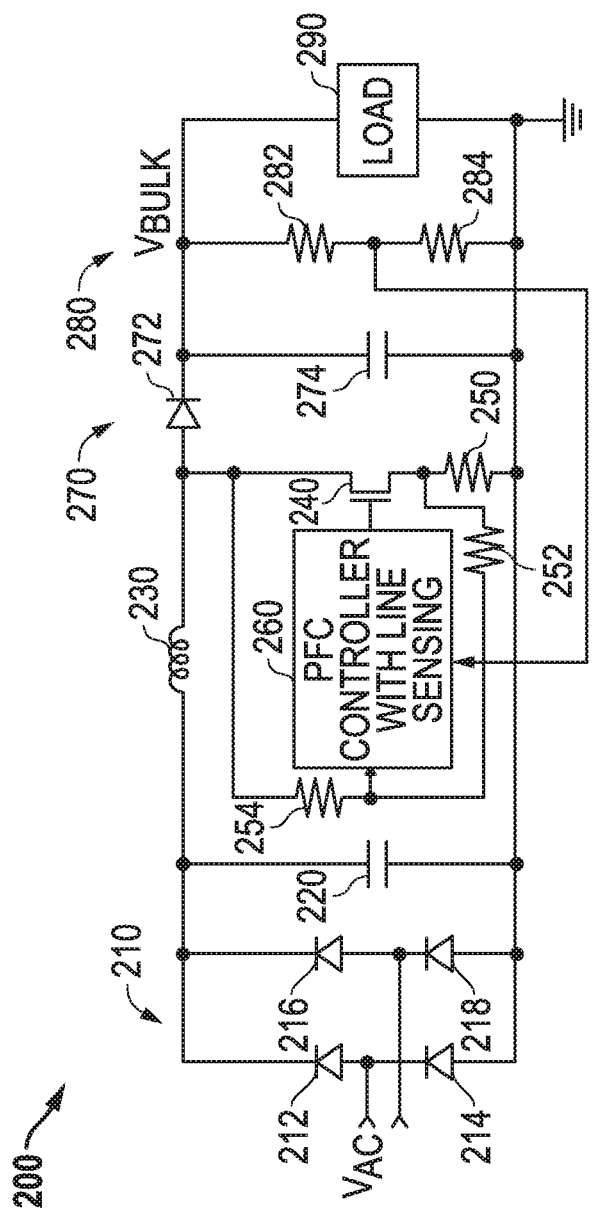
FIG. 2 illustrates in partial block diagram and partial schematic form an offline converter having an integrated circuit power factor controller according to an embodiment of the present invention.

FIG. 2 illustrates in partial block diagram and partial schematic form an offline converter 200 having an integrated circuit power factor controller 260 according to an embodiment of the present invention. Offline converter 200 includes a bridge rectifier 210, a capacitor 220, an inductor 230, a transistor 240, a sense resistor 250, resistors 252 and 254, integrated circuit power factor controller 260, a an output circuit 270, a feedback circuit 280, and a load 290.

Bridge rectifier 210 includes diodes 212, 214, 216, and 218. Diode 212 has an anode for receiving a first component of an AC input voltage labeled "$V_{AC}$", and a cathode. Diode 214 has an anode connected to ground, and a cathode connected to the anode of diode 212. Diode 216 has an anode for receiving a second component of $V_{AC}$, and a cathode connected to the cathode of diode 212. Diode 218 has an anode connected to ground, and a cathode connected to the anode of diode 216.

Capacitor 220 has a first terminal connected to the cathodes of diodes 212 and 216, and a second terminal connected to ground. Inductor 230 has a first terminal connected to the cathodes of diodes 212 and 216, and a second terminal. Transistor 240 is an N-channel power metal-oxide-semiconductor (MOS) transistor having a drain connected to the second terminal of inductor 230, and gate, and a source. Resistor 250 has a first terminal connected to the source of transistor 240, and a second terminal connected to ground. Resistor 252 has a first terminal connected to the source of transistor 240, and a second terminal. Resistor 254 has a first terminal connected to the second terminal of resistor 252, and a second terminal connected to the second terminal of inductor 230.

Integrated circuit power factor controller 260 has a first input connected to the second terminal of resistor 252, a second input, and an output connected to the gate of transistor 240.

Output circuit 270 includes a diode 272 and a capacitor 274. Diode 272 has an anode connected to the second terminal of inductor 230, and a cathode for providing a power factor compensated voltage labeled "$V_{BULK}$". Capacitor 274 has a first terminal connected to the cathode of diode 272, and a second terminal connected to ground.

Feedback circuit 280 includes resistors 282 and 284. Resistor 282 has a first terminal connected to the cathode of diode 272, and a second terminal connected to the first input of integrated circuit power factor controller 260. Resistor 284 has a first terminal connected to the second terminal of resistor 282, and a second terminal connected to ground.

Load 290 has a first terminal connected to the cathode of diode 272, and a second terminal connected to ground.

In operation, bridge rectifier 210 converts the full-wave $V_{AC}$ signal into a half-wave rectified (haversine) signal. Capacitor 220 smoothes the large ripple in the haversine signal to provide a smoothed haversine signal. Inductor 230 provides further smoothing of the haversine signal by storing energy during the on-time of the transistor 240, and delivering the stored energy to load 290 during the off-time of transistor 240. Diode 272 and capacitor 274 further rectify and smooth the power factor corrected signal to form $V_{BULK}$. Feedback circuit 280 generates a feedback voltage as a fraction of $V_{BULK}$.

Integrated circuit power factor controller 260 is configured in a boost architecture and modulates the conductivity of transistor 240 to deliver power to a load with a high power factor. It uses the feedback signal generated by feedback circuit 280 in voltage-mode control to modulate the on-time of transistor 240, and determines both the current through transistor 240 sensed by resistor 250, and the magnetization state of inductor 230.

A conventional power factor controller such as integrated circuit power factor controller 100 of FIG. 1 requires an additional input terminal to sense the line voltage for on-time control and high- and low-line sensing and protection, as well as for control and protection functions such as cycle skipping. The additional terminal increases the cost of both the power factor controller chip and the board. Integrated circuit power factor controller 260, however, includes a line sensing multiplier that forms the product of the line voltage and the error signal without the use of a sense signal received on an external terminal, thereby saving product cost.

The duty cycle, represented by, for example, the off-time duty cycle "$D_{OFF}$" is proportional to the line voltage, regardless of whether the power factor controller is operating in continuous conduction mode (CCM), critical conduction mode (CrM), or discontinuous conduction mode (DCM), and this relationship can be used to form a line sensing multiplier.

In CCM and CrM, there are two phases. During the on-time of transistor 240, a time-varying input voltage $V_{IN}(t)$ is applied between the first and second terminals of inductor 230. During the off-time of transistor 240, a voltage equal to $V_{BULK}-V_{IN}(t)$ is applied between the second and first terminals of inductor 230. Applying the volt-balance law:

$$V_{IN}(t) \cdot t_{ON} = (V_{BULK} - V_{IN}(t)) \cdot t_{OFF} \quad [1]$$

in which $t_{ON}$ is the on-time of transistor 240 and $t_{OFF}$ is the off-time of transistor 240. Rearranging equation [1]:

$$V_{IN}(t) \cdot (t_{ON} + t_{OFF}) = V_{BULK} \cdot t_{OFF} \quad [2]$$

In CCM or CrM, there is no dead time and thus $t_{ON} + t_{OFF} = T_{SW}$. Hence:

$$D_{OFF} = \frac{t_{OFF}}{t_{ON} + t_{OFF}} = \frac{V_{IN}(t)}{V_{BULK}} \quad [3]$$

in which $D_{OFF}$ is the off-time duty ratio of transistor 240. Assuming $V_{BULK}$ is substantially constant, then the off-time duty ratio $D_{OFF}$ is proportional to the instantaneous input voltage.

In DCM, there are three phases: on-time, off-time, and dead-time in which the on-time duty ratio is designated "$d_1$", the off-time duty ratio is designated "$d_2$", and the dead time duty ratio is designated "$d_3$", and in which $d_1 = t_{ON}/T_{SW}$, $d_2 = t_{OFF}/T_{SW}$, and $d_3 = t_{DT}/T_{SW}$. Note that the off-time duty ratio $D_{OFF}$ is different than $d_2$ because of the dead time, and can be expressed as:

$$D_{OFF} = \frac{t_{OFF}}{t_{ON} + t_{OFF}} = \frac{t_{OFF}}{T_{SW} - t_{DT}} \quad [4]$$

in which $t_{DT}$ is the dead time. Applying the volt-balance law:

$$V_{IN}(t) \cdot t_{ON} - (V_{BULK} - V_{IN}(t)) \cdot t_{OFF} + 0 \cdot t_{DT} = 0 \quad [5]$$

As before:

$$D_{OFF} = \frac{t_{OFF}}{t_{ON} + t_{OFF}} = \frac{V_{IN}(t)}{V_{BULK}} \quad [6]$$

Again assuming $V_{BULK}$ is substantially constant, then the off-time duty ratio $D_{OFF}$ in DCM is also proportional to the instantaneous input voltage. How integrated circuit power factor controller 260 performs a multiplication operation with integral line sensing using this relationship between duty cycle and line voltage will now be described.

Figure 3:
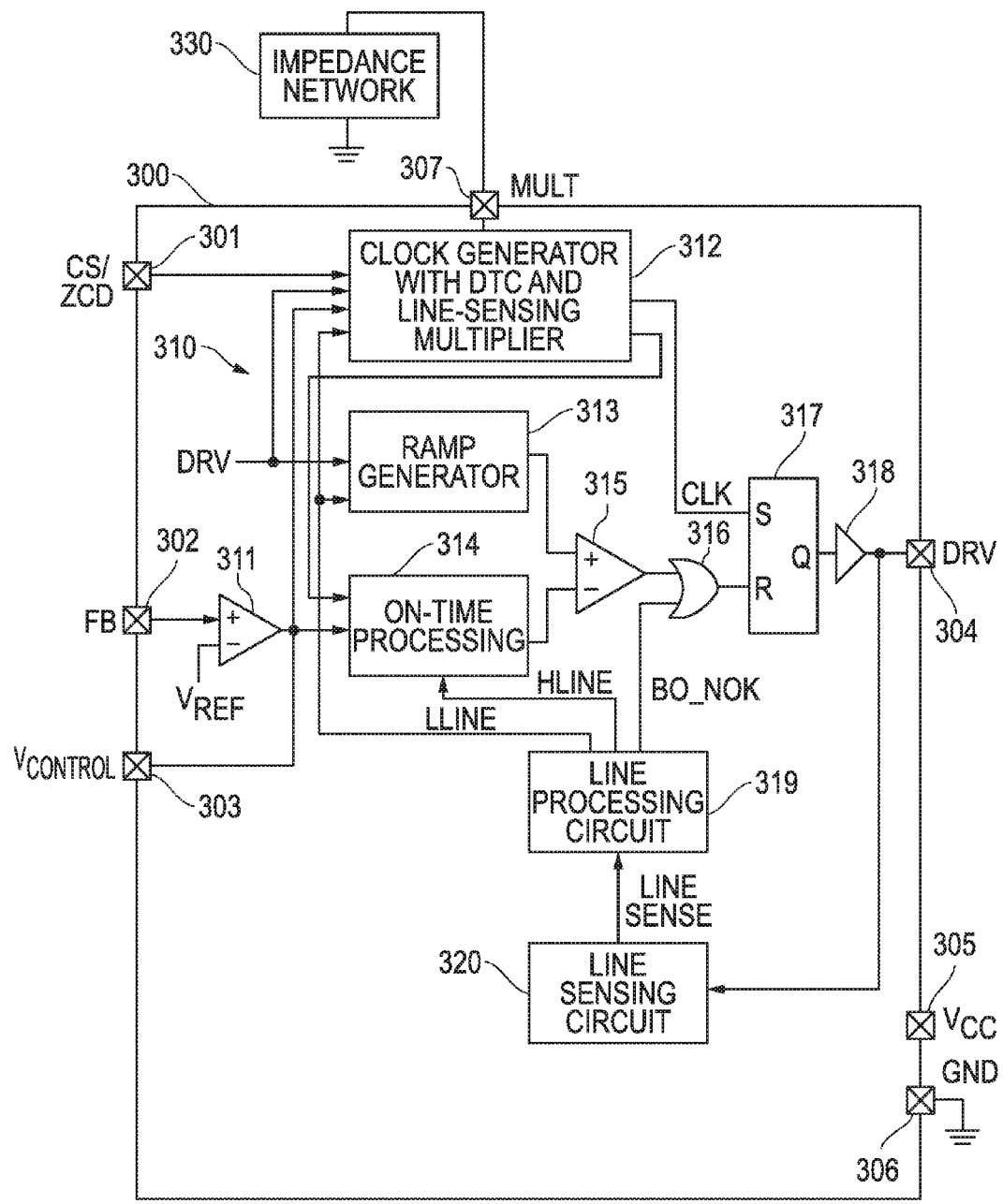
FIG. 3 illustrates in block diagram form an integrated circuit power factor controller that can be used as the integrated circuit power factor controller of FIG. 2.

FIG. 3 illustrates in block diagram form an integrated circuit power factor controller 300 that can be used as integrated circuit power factor controller 260 of FIG. 2. Integrated circuit power factor controller 300 includes generally a set of terminals 301-307, a pulse width modulator 310, a line sensing circuit 320, and an impedance network 330. The terminals include a current sense/zero current detect terminal 301 (CS/ZCD), a feedback terminal 302 (FB), a control terminal 303 ($V_{CONTROL}$), a drive terminal 304 (DRV), a positive power supply voltage terminal 305 ($V_{CC}$), a ground terminal 306 (GND), and a multiplier terminal 307 (MULT).

Pulse width modulator 310 includes an error amplifier 311, a clock generator with dead time control (DTC) and line sensing multiplier 312, a ramp generator 313, an on-time processing circuit 314, a comparator 315, an OR gate 316, a latch 317, a driver 318, and a line processing circuit 319. Error amplifier 311 has a non-inverting input connected to feedback terminal 302, an inverting input for receiving voltage $V_{REF}$, and an output connected to compensation terminal 303. Clock generator with DTC and line sensing multiplier 312 has a first input connected to terminal 301, a second input for receiving the DRV signal, a third input connected to the output of error amplifier 311, a fourth input for receiving a signal labeled "LLINE", a first output for providing the CLK signal, and a second output for providing a dead time signal, and a skip signal. Ramp generator 313 has a first input for receiving the DRV signal, a second input for receiving the LLINE signal, and an output. On-time processing circuit 314 has a first input connected to the second output of clock generator with DTC and line sensing multiplier 312, a second input connected to the output of error amplifier 311, a third input for receiving a signal labeled "HLINE", and an output. Comparator 315 has a positive input connected to the output of ramp generator 313, a negative input connected to the output of on-time processing circuit 314, and an output. OR gate 316 has a first input connected to the output of comparator 315, a second input for receiving a signal labeled "BO_NOK", and an output. Latch 317 in an SR latch having a set input S connected to the first output of clock generator with DTC and line sensing multiplier 312, a reset input R connected to the output of OR gate 316, and an output Q. Driver 318 has an input connected to the output of latch 317, and an output connected drive terminal 304 for providing the DRV signal. Line processing circuit 319 has an input for receiving a signal labeled "LINE SENSE", a first output connected to the fourth input of clock generator with DTC circuit 312 and to the second input of ramp generator 313 for providing the LLINE signal, a second output connected to the third input of on-time processing circuit 314 for providing the HLINE signal, and a third output connected to the second input of OR gate 316 for providing the BO_NOK signal.

Line sensing circuit 320 has an input connected to the output of driver 318 for receiving the DRV signal, and an output connected to the input of line processing circuit 319 for providing the LINE SENSE signal.

Impedance network 330 has a first terminal connected to multiplier terminal 307, and a second terminal connected to ground.

In operation, integrated circuit power factor controller 300 is part of an offline converter that modulates the conduction of transistor 240 whose gate is connected to drive terminal 304 in order to deliver power to load 290 with a high power factor.

Error amplifier 311 develops an error signal proportional to the difference between FB and $V_{REF}$ in order to regulate the output voltage to a desired level. Compensation terminal 303 provides a connection point between the output of error amplifier 311 and an off-chip compensation network that is used for loop stability.

Clock generator with DTC and line sensing multiplier 312 uses the CS/ZCD input to detect the inductor reset and to provide a current limit protection function. It uses the CS/ZCD signal as a zero current detect signal to modulate the dead-time of the DRV signal and to selectively generate the CLK signal to latch 317. It uses the CS/ZCD signal as a current sense signal to detect that the current through the external transistor has reached its limit and to cause on-time processing circuit 314 to deactivate the DRV signal in response. Clock generator with DTC and line sensing multiplier 312 also uses the DRV signal and the error signal to determine when to provide the CLK signal to latch 317. As will be described more fully below, it also includes a line sensing multiplier that receives both the error signal and the drive signal, and forms a multiplied signal. Since it performs the multiplication in the current domain, it uses external impedance network 330 to convert the current into a voltage. The pulse width modulator 310 then uses the multiplied signal for one or more control functions, such as to generate the skip signal for improved efficiency in light-load conditions, that will be described more fully below.

Ramp generator 313 provides a ramp signal to its output to determine the on-time of transistor 240. Upon receiving the LLINE signal, it changes the slope of the ramp signal, in which the ramp signal is steeper in high-line conditions than in low-line conditions.

On-time processing circuit 314 processes the error signal and the LLINE signal to generate an on-time voltage reference level. Comparator 315 uses the on-time voltage reference level and the ramp signal generated by ramp generator 313 to determine the on-time of the external transistor by determining when to reset latch 317. During a brownout condition in response to a low LINE SENSE voltage, line processing circuit 319 activates the BO_NOK signal, which also resets latch 317.

Integrated circuit power factor controller 300 may include several additional protection mechanisms that are not described here in detail.

Unlike integrated circuit power factor controller 100, however, integrated circuit power factor controller 300 does not require a separate $V_{SENSE}$ terminal to sense the line voltage. It includes a line sensing multiplier that multiplies the error signal according to the duty cycle of the DRV signal, which indicates the level of the line voltage, to form a multiplied signal. Pulse width modulator 310 then provides the drive signal in response to the multiplied signal. For example, the multiplied signal may be used to indicate whether to go into a skip mode, and pulse width modulator 310 compares the multiplied signal to a reference voltage and output a skip voltage in response.

Line sensing circuit 320 also provides the LINE SENSE signal by measuring $D_{OFF}$ from the on- and off-time of the DRV signal and without using an explicit line sense signal. Thus integrated circuit power factor controller 300 performs the same protection and line feed-forward functions as integrated circuit power factor controller 100 but with lower integrated circuit and circuit board cost. The way in which line sensing circuit 320 does this function will now be described.

Figure 4:
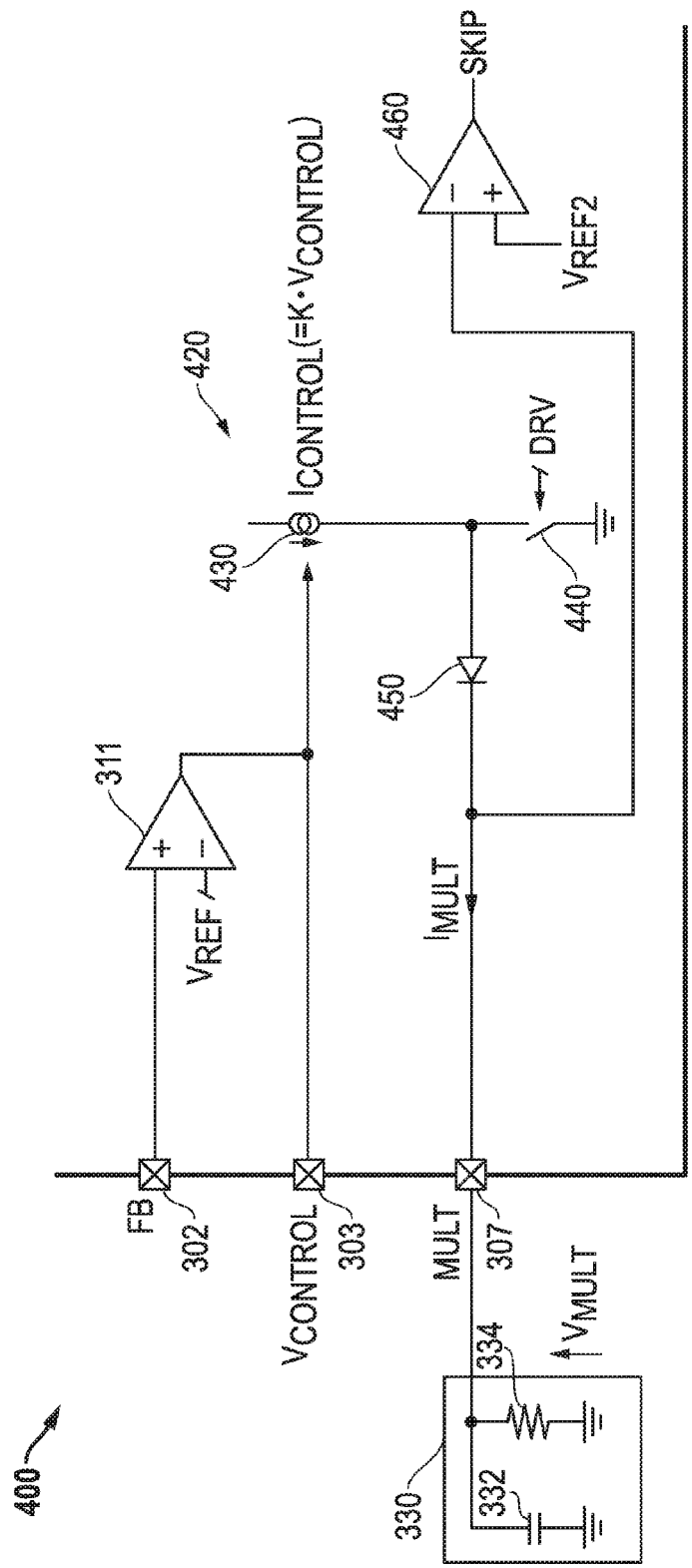
FIG. 4 illustrates in partial block diagram and partial schematic form a portion of the power factor controller of FIG. 3 having a line sensing multiplier according to one embodiment.

FIG. 4 illustrates in partial block diagram and partial schematic form a portion 400 of power factor controller 300 and impedance network 330 of FIG. 3 having a line sensing multiplier 420 according to one embodiment. Portion 400 includes error amplifier 311, impedance network 330, line sensing multiplier 420, and a skip circuit 460. Line sensing multiplier 420 includes a variable current source 430, a switch 440, and a diode 450. Variable current source 430 has a first terminal connected to an internal power supply voltage terminal, a second terminal, and a control terminal connected to the output of error amplifier 311. Switch 440 has a first terminal connected to the second terminal of variable current source 430, a second terminal connected to ground, and a control terminal for receiving the DRV signal. Diode 450 functions as a rectifier and has an anode connected to the second terminal of variable current source 430, and a cathode connected to multiplier terminal 307.

Impedance network 330 includes a capacitor 332 and a resistor 334. Capacitor 332 has a first terminal connected to multiplier terminal 307, and a second terminal connected to ground. Resistor 334 has a first terminal connected to multiplier terminal 307, and a second terminal connected to ground.

Skip circuit 460 is implemented with a comparator having a negative input connected to multiplier terminal 307, a positive input for receiving reference voltage $V_{REF2}$, and an output for providing a skip signal labeled "SKIP" to on-time processing circuit 314.

In operation, line sensing multiplier 420 implicitly uses $D_{OFF}$ to perform a multiplication function and thereby to save an integrated circuit pin. This circuit is operable in CrM and CCM as follows. The voltage on multiplier terminal 307 $V_{MULT}$ can be expressed as follows:

$$V_{MULT} = R \cdot I_{CONTROL} \cdot D_{OFF} \qquad [7]$$

Since:

$$D_{OFF} = \frac{V_{IN}(t)}{V_{BULK}} \qquad [8]$$

and:

$$I_{CONTROL} = k \cdot V_{CONTROL} \qquad [9]$$

then:

$$V_{MULT} = \frac{R \cdot K}{V_{BULK}} \cdot V_{CONTROL} \cdot V_{IN}(t) \quad [10]$$

Therefore the multiplied voltage $V_{MULT}$ is proportional to the product of the input voltage $V_{IN}(t)$ and the error voltage $V_{CONTROL}$ with a gain of $$\frac{R \cdot K}{V_{BULK}}.$$

Figure 5:
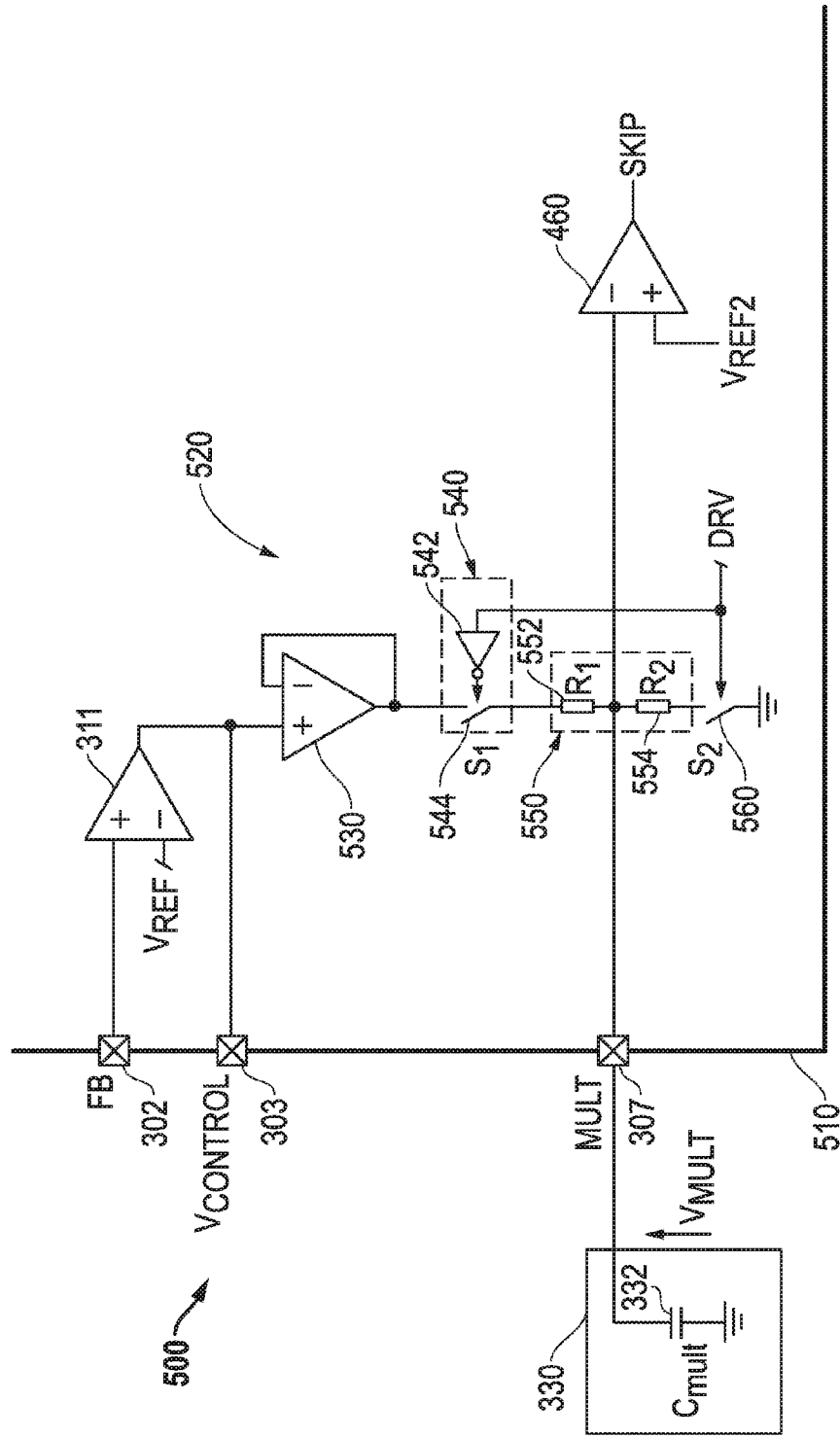
FIG. 5 illustrates in partial block diagram and partial schematic form a portion of the power factor controller of FIG. 3 having a line sensing multiplier according to another embodiment.

FIG. 5 illustrates in partial block diagram and partial schematic form a portion 500 of the power factor controller 300 of FIG. 3 having a line sensing multiplier 520 according to another embodiment. Portion 500 includes error amplifier 311, impedance network 330, line sensing multiplier 520, and skip circuit 460. Line sensing multiplier 520 includes a buffer 530, a switch circuit 540, a resistor divider 550, and a switch circuit 560. Buffer 530 has a non-inverting input connected to the output of error amplifier 311, an inverting input, and an output connected to the inverting input. Switch circuit 540 includes an inverter 542 and a switch 544. Inverter 542 has an input for receiving the DRV signal, and an output. Switch 544 has a first terminal connected to the output of buffer 530, a second terminal, and a control terminal connected to the output of inverter 542. Resistor divider 550 includes resistors 552 and 554. Resistor 552 has a first terminal connected to the second terminal of switch 544, and a second terminal connected to multiplier terminal 307. Resistor 554 has a first terminal connected to the second terminal of resistor 552, and a second terminal. Switch circuit 560 is implemented with a switch having a first terminal connected to the second terminal of resistor 554, a second terminal connected to ground, and a control terminal for receiving the DRV signal.

Like line sensing multiplier 420, line sensing multiplier 520 is also suitable for use in CrM and CCM to form a multiplied signal on multiplier terminal 307. If capacitor 332 were not connected to multiplier terminal 307, then $V_{MULT}$ would be equal to $V_{CONTROL}$ when DRV is low and 0 when DRV is high. Thus the average value on multiplier terminal 307 (with a time constant of $R \cdot C_{330}$, in which $R_{552}=R_{554}=R$) can be expressed as follows:

$$V_{MULT}=V_{CONTROL} \cdot (1-D_{ON}) \quad [11]$$

but:

$$(1 - D_{ON}) = D_{OFF} = \frac{V_{IN}(t)}{V_{BULK}} \quad [12]$$

And thus:

$$V_{MULT} = \frac{1}{V_{BULK}} \cdot V_{CONTROL} \cdot V_{IN}(t) \quad [13]$$

Therefore multiplied voltage $V_{MULT}$ is proportional to the product of the input voltage $V_{IN}(t)$ and the error voltage $V_{CONTROL}$ with a gain of $$\frac{1}{V_{BULK}}.$$

Figure 6:
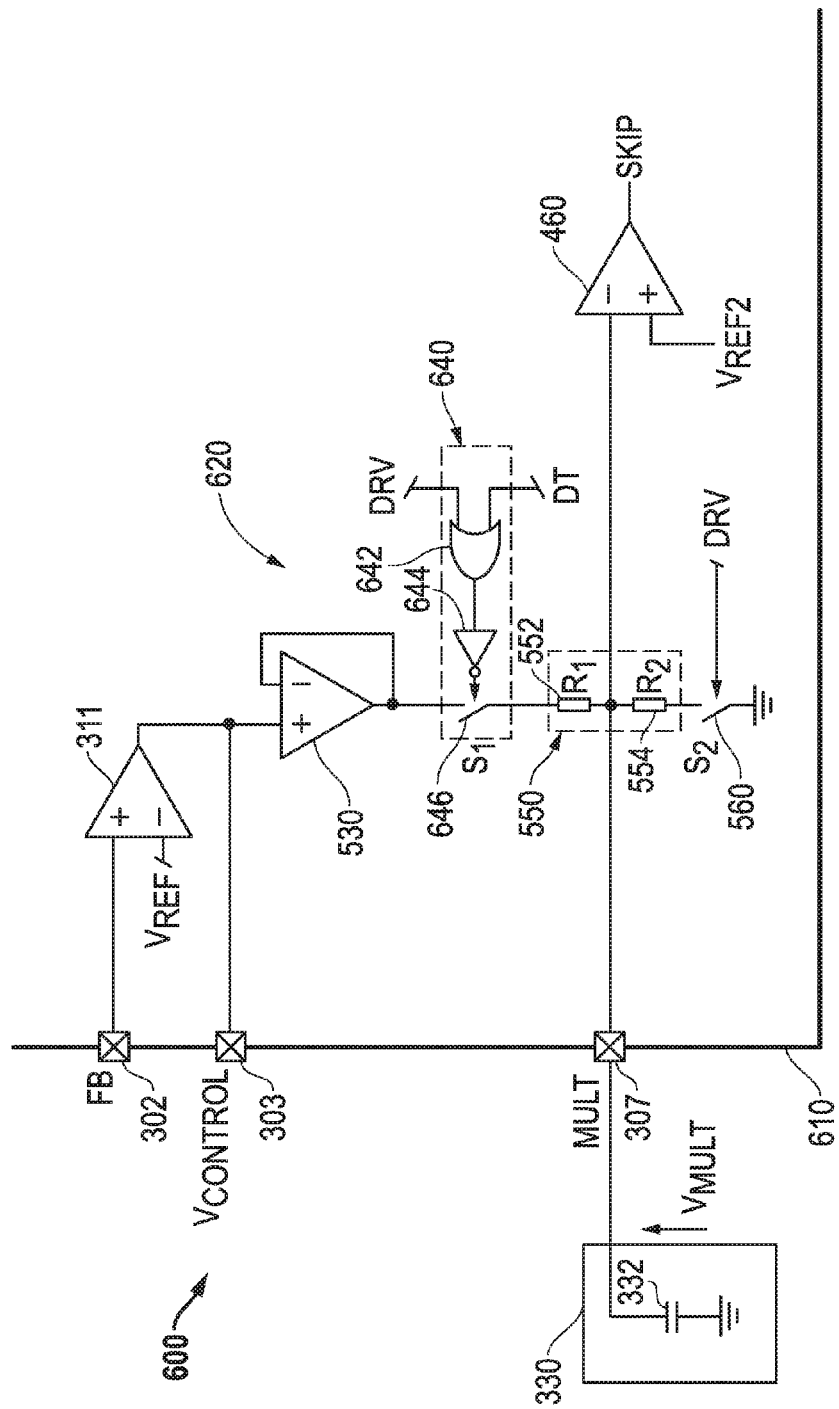
FIG. 6 illustrates in partial block diagram and partial schematic form a portion of the power factor controller of FIG. 3 having a line sensing multiplier according to yet another embodiment.

FIG. 6 illustrates in partial block diagram and partial schematic form a portion 600 of the power factor controller 300 of FIG. 3 having a line sensing multiplier 620 according to yet another embodiment. Portion 600 includes error amplifier 311, impedance network 330, line sensing multiplier 620, and skip circuit 460. Line sensing multiplier 620 includes buffer 530, a switch circuit 640, resistor divider 550, and switch circuit 560. Switch circuit 540 includes an OR gate 642, an inverter 644, and a switch 646. OR gate 642 has a first input for receiving the DRV signal, a second input for receiving a dead-time signal labeled "DT", and an output. Inverter 644 has an input connected to the output of OR gate 642, and an output. Switch 646 has a first terminal connected to the output of buffer 530, a second terminal connected to the first terminal of resistor 552, and a control terminal connected to the output of inverter 644.

Like line sensing multipliers 420 and 520, line sensing multiplier 620 is also suitable for use in CrM and CCM to form a multiplied signal on multiplier terminal 307, but line sensing multiplier 620 is also suitable for use in DCM. Line sensing multiplier 620 uses OR gate 642 to ensure that switch 646 is closed only if both signals DRV and DT are low. If capacitor 332 were not connected to multiplier terminal 307, then $V_{MULT}$ would be equal to $V_{CONTROL}$ when DRV and DT are low, 0 when DRV is high, and open when DT is high. Thus the average value on multiplier terminal 307 (with a time constant of $R \cdot C_{330}$, in which $R_{552}=R_{554}=R$) can be expressed as follows:

$$V_{MULT}=(0 \cdot d_1)+V_{CONTROL} \cdot d_2+(V_{MULT} \cdot d_3) \quad [14]$$

Now:

$$\frac{d_2}{d_1 + d_2} = \frac{d_2}{1 - d_3} = \frac{V_{IN}(t)}{V_{BULK}} \quad [15]$$

And thus:

$$V_{MULTI} = \frac{1}{V_{BULK}} \cdot V_{CONTROL} \cdot V_{IN}(t) \quad [16]$$

Therefore multiplied voltage $V_{MULT}$ is proportional to the product of the input voltage $V_{IN}(t)$ and the error voltage $V_{CONTROL}$ with a gain of $$\frac{1}{V_{BULK}}.$$

Thus line sensing multipliers 420 and 520 are capable of operating in both CrM and CCM, but line sensing multiplier 620 allows operation in DCM as well.

In an alternative embodiment, an additional resistor could be added between multiplier terminal 307 and the common node that connects resistors 552 and 554. In this case, the multiplied voltage is obtained from multiply terminal 307. Resistors 552 and 554 could also be shorted or removed, and this new resistor inserted between multiplier terminal 307 and the common connection point of switch circuits 646 and 560.

Figure 7:
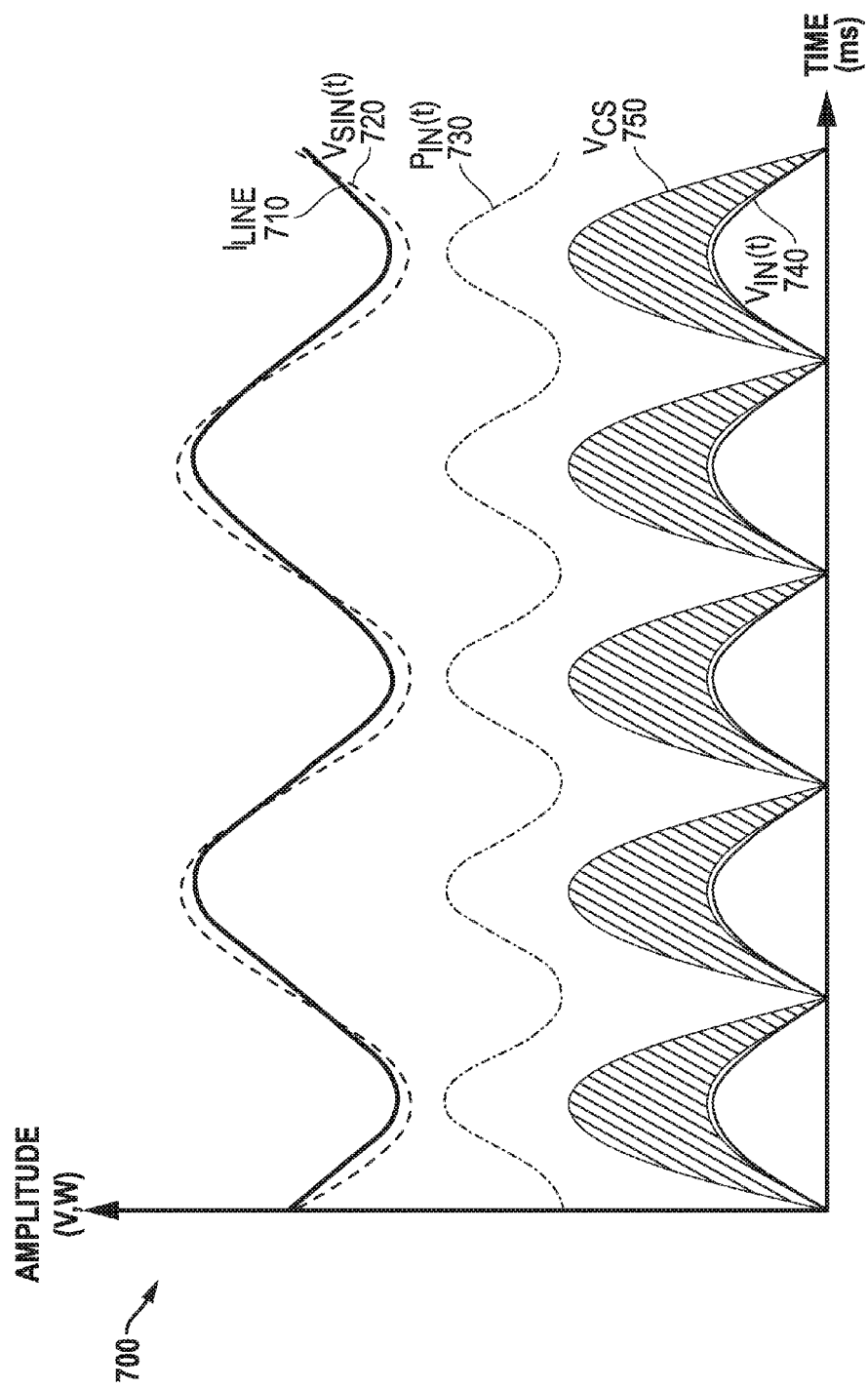
FIG. 7 illustrates a timing diagram showing a simulation of the operation of the line sensing multiplier of FIG. 6 at low line voltage.

FIG. 7 illustrates a timing diagram 700 showing a simulation of the operation of line sensing multiplier 620 of FIG. 6 at low line voltage. Timing diagram 700 shows the operation of line sensing multiplier 620 in a simplified, CrM, current-mode power factor controller that uses a multiplier to generate the current reference for the set point of the MOS transistor configured like transistor 240 of FIG. 2. In FIG. 7, the horizontal axis represents time in milliseconds (ms), and the vertical axis represents the amplitude of various signals in either volts (V) or watts (W). Timing diagram 700 shows five waveforms of interest, including a waveform 710 showing a measured line current signal labeled "$I_{LI}NE$", a waveform 720 showing a full wave sensed line voltage signal labeled "$V_{SIN}(t)$", a waveform 730 showing a power signal labeled "$P_{IN}(t)$" in watts, a waveform 740 showing line voltage $V_{IN}(t)$, and a waveform 750 showing a current sense signal labeled "$V_{CS}$". In this case, line voltage signal $V_{IN}(t)$ corresponds to a low line voltage such as the North American line voltage which is nominally 110 volts RMS but was simulated at 122 volts. Timing diagram 700 shows that offline converter 300 is able to achieve high power factor using integral line sensing. The simulation results provide a computation of power factor (PF) as follows:

$$PF = \frac{P_{IN\cdot AVG}}{V_{IN\cdot RMS} \cdot I_{IN\cdot RMS}} \approx \frac{123.38}{122 \cdot 1.012} \approx 0.999 \quad [17]$$

Thus integrated circuit power factor controller 300 obtains very high power factor.

Figure 8:
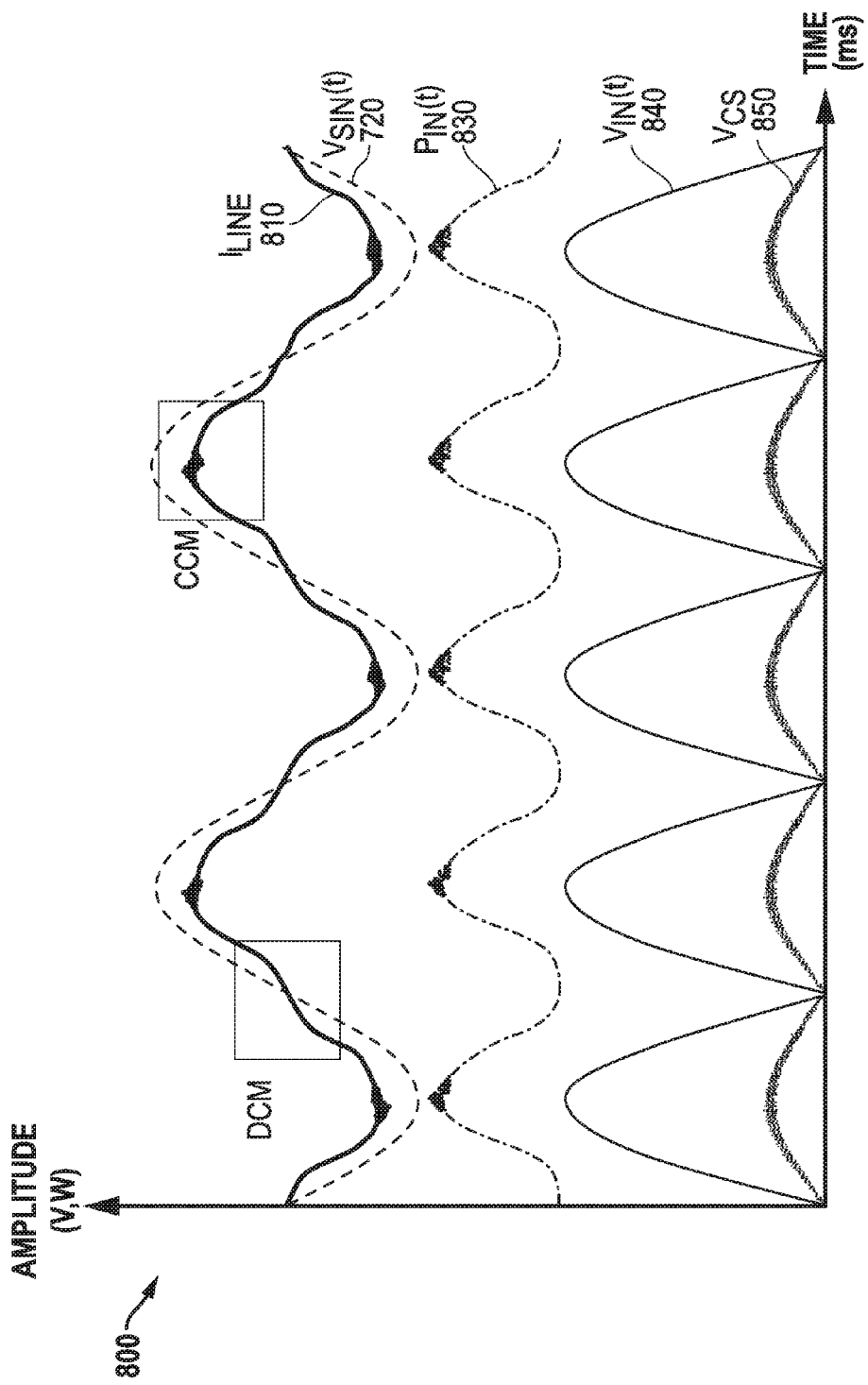
FIG. 8 illustrates a timing diagram showing a simulation of the operation of the line sensing multiplier of FIG. 6 at high line voltage.

FIG. 8 illustrates a timing diagram 800 showing a simulation of the operation of the sensing multiplier 620 of FIG. 6 at high line voltage. Timing diagram 700 shows the operation of line sensing multiplier 620 in a simplified, CrM, current-mode power factor controller that uses a multiplier to generate the current reference for the set point of the MOS transistor configured like transistor 240 of FIG. 2. In FIG. 7, the horizontal axis represents time in milliseconds (ms), and the vertical axis represents the amplitude of various signals in either volts (V) or watts (W). Timing diagram 800 shows five waveforms of interest, including a waveform 710 showing signal $I_{LINE}$, a waveform 720 showing signal $V_{SIN}(t)$, a waveform 730 showing signal $P_{IN}(t)$ in watts, a waveform 740 showing line voltage $V_{IN}(t)$, and a waveform 750 showing signal $V_{CS}$. Near the zero crossings of the voltage and current sine waves, the power factor controller enters DCM and near the peaks, it enters CCM.

In this case, line voltage signal $V_{IN}(t)$ corresponds to a high line voltage such as the European line voltage which is nominally 220 volts RMS, but was simulated at 276 volts. Timing diagram 700 shows that offline converter 300 is able to achieve high power factor. The simulation results provide a computation of power factor (PF) as follows:

$$PF = \frac{P_{IN\cdot AVG}}{V_{IN\cdot RMS} \cdot I_{IN\cdot RMS}} \approx \frac{123.3}{276 \cdot 0.45} \approx 0.985 \quad [17]$$

Thus the power factor is again very high.

Thus various embodiments of an offline power converter and an integrated circuit power factor controller have been described. The integrated circuit power factor controller measures the line voltage for such purposes as protection and line feed forward control by measuring the duty cycle of a transistor drive signal or modulating a signal corresponding to an error signal using the drive signal to form a multiplied signal, and thus does not require an additional line sense input terminal.

The above-disclosed subject matter is to be considered illustrative, and not restrictive, and the appended claims are intended to cover all such modifications, enhancements, and other embodiments that fall within the true scope of the claims. For example, in various embodiments all or only some of the protection mechanisms and feed-forward control using duty cycle measurement of line voltage may be implemented. Moreover the protection circuits may be implemented in various ways. Various line sensing multipliers can be used depending on whether operation in DCM is supported. Diodes uses as rectifiers may also be replaced by other types of rectifiers such as synchronous rectifiers.

Thus, to the maximum extent allowed by law, the scope of the present invention is to be determined by the broadest permissible interpretation of the following claims and their equivalents, and shall not be restricted or limited by the foregoing detailed description.

What is claimed is:

1. An integrated circuit power factor controller comprising:
   a feedback input terminal for receiving a feedback signal representative of an output voltage;
   a control terminal for receiving an error signal and adapted to be coupled to a compensation network;
   a drive terminal for providing a drive signal and adapted to be coupled to a transistor; and
   a pulse width modulator coupled to said feedback input terminal, said control terminal, and said drive terminal, wherein said pulse width modulator provides said drive signal having a duty cycle formed in response to said feedback signal,
   wherein said pulse width modulator comprises a line sensing multiplier having a first input for receiving said error signal, a second input for receiving said drive signal, and an output for providing a multiplied signal, wherein said pulse width modulator further provides said drive signal in response to said multiplied signal.

2. The integrated circuit power factor controller of claim 1, further comprising:
   an error amplifier having a first input for receiving said feedback signal, a second input for receiving a reference signal, and an output coupled to said control terminal for providing said error signal in response to a difference between said feedback signal and said reference signal.

3. The integrated circuit power factor controller of claim 1, wherein said line sensing multiplier comprises:
   a variable current source having a control input for receiving said error signal, and an output for providing a first current proportional to said error signal;
   a switch having a first terminal coupled to said output of said variable current source, a second terminal coupled to a ground terminal, and a control terminal for receiving said drive signal; and
   a rectifier having an input coupled to said output of said variable current source, and an output adapted to be coupled to an impedance network for providing said multiplied signal.

4. The integrated circuit power factor controller of claim 3, wherein the integrated circuit power factor controller further comprises a multiplier terminal coupled to said output of said rectifier, and said impedance network is external to the integrated circuit power factor controller and is coupled to said multiplier terminal.

5. The integrated circuit power factor controller of claim 1, wherein said line sensing multiplier comprises:
   a buffer having an input for receiving said error signal, and an output;

a first switch circuit having a first terminal coupled to said output of said buffer, a second terminal, and a control terminal for receiving said drive signal;

a first resistor having a first terminal coupled to said second terminal of said first switch circuit, and a second terminal coupled for providing said multiplied signal;

a second resistor having a first terminal coupled to said second terminal of said first resistor, and a second terminal; and a second switch circuit having a first terminal coupled to said second terminal of said second resistor, a second terminal coupled to a ground terminal, and a control terminal for receiving said drive signal.

6. The integrated circuit power factor controller of claim 5, wherein the integrated circuit power factor controller further comprises:

a multiplier terminal coupled to said second terminal of said first resistor, and adapted to be coupled to an impedance network.

7. The integrated circuit power factor controller of claim 5, wherein said first switch circuit couples said output of said buffer to said first terminal of said first resistor in response to said drive signal being in an inactive state, and decouples said output of said buffer from said first terminal of said first resistor in response to said drive signal being in an active state.

8. The integrated circuit power factor controller of claim 7, wherein said first switch circuit further couples said output of said buffer to said first terminal of said first resistor in response to both said drive signal and a dead-time signal being in said inactive state, and decouples said output of said buffer from said first terminal of said first resistor in response to either said drive signal being in said active state or said dead-time signal being in said active state.

9. The integrated circuit power factor controller of claim 8, wherein said second switch circuit couples said second terminal of said second resistor to said ground terminal in response to said drive signal being in said active state.

10. An offline converter comprising:

an input line for receiving a rectified AC voltage;

a transistor having a first current electrode coupled to said input line, a second current electrode coupled to a ground terminal, and a control electrode for receiving a drive signal;

a diode having a first terminal coupled to said input line, and a second terminal for providing an output voltage;

an output capacitor having a first terminal coupled to said second terminal of said diode, and a second terminal coupled to said ground terminal;

a feedback circuit for providing a feedback signal in response to a level of said output voltage; and an integrated circuit power factor controller having a first input terminal coupled to said output of said feedback circuit, and an output terminal for providing said drive signal, said integrated circuit power factor controller generating an error signal in response to said feedback signal, forming a sensed line signal in response to said drive signal without measuring a voltage on said input line, multiplying said error signal and said sensed line signal to provide a multiplied signal, and providing said drive signal in response to said multiplied signal.

11. The offline converter of claim 10, further comprising:

an error amplifier having a first input for receiving said feedback signal, a second input for receiving a reference signal, and an output coupled to a control terminal for providing said error signal in response to a difference between said feedback signal and said reference signal.

12. The offline converter of claim 10, wherein said integrated circuit power factor controller further comprises:

a pulse width modulator coupled to said feedback input terminal, said control terminal, and said drive terminal, wherein said pulse width modulator provides said drive signal having a duty cycle formed in response to said feedback signal, wherein said pulse width modulator comprises a line sensing multiplier having a first input for receiving said error signal, a second input for receiving said drive signal, and an output for providing a multiplied signal, wherein said pulse width modulator further provides said drive signal in response to said multiplied signal, and wherein said line sensing multiplier comprises:

a variable current source having a control input for receiving said error signal, and an output for providing a first current proportional to said error signal;

a switch having a first terminal coupled to said output of said variable current source, a second terminal coupled to said ground terminal, and a control terminal for receiving said drive signal; and a rectifier having an input coupled to said output of said variable current source, and an output adapted to be coupled to an impedance network for providing said multiplied signal.

13. The offline converter of claim 12, wherein the integrated circuit power factor controller further comprises a multiplier terminal coupled to said output of said rectifier, and said impedance network is external to the integrated circuit power factor controller and is coupled to said multiplier terminal.

14. The offline converter of claim 10, wherein said integrated circuit power factor controller further comprises:

a pulse width modulator coupled to said feedback input terminal, said control terminal, and said drive terminal, wherein said pulse width modulator provides said drive signal having a duty cycle formed in response to said feedback signal, wherein said pulse width modulator comprises a line sensing multiplier having a first input for receiving said error signal, a second input for receiving said drive signal, and an output for providing a multiplied signal, wherein said pulse width modulator further provides said drive signal in response to said multiplied signal, and wherein said line sensing multiplier comprises:

a buffer having an input for receiving said error signal, and an output;

a first switch circuit having a first terminal coupled to said output of said buffer, a second terminal, and a control terminal for receiving said drive signal;

a first resistor having a first terminal coupled to said second terminal of said first switch circuit, and a second terminal coupled for providing said multiplied signal;

a second resistor having a first terminal coupled to said second terminal of said first resistor, and a second terminal; and a second switch circuit having a first terminal coupled to said second terminal of said second resistor, a second terminal coupled to said ground terminal, and a control terminal for receiving said drive signal.

15. The offline converter of claim 14, wherein the integrated circuit power factor controller further comprises:
a multiplier terminal coupled to said second terminal of said first resistor, and adapted to be coupled to an impedance network.

16. The offline converter of claim 14, wherein said first switch circuit couples said output of said buffer to said first terminal of said first resistor in response to said drive signal being in an inactive state, and decouples said output of said buffer from said first terminal of said first resistor in response to said drive signal being in an active state.

17. The offline converter of claim 16, wherein said first switch circuit further couples said output of said buffer to said first terminal of said first resistor in response to both said drive signal and a dead-time signal being in said inactive state, and decouples said output of said buffer from said first terminal of said first resistor in response to either said drive signal being in said active state or said dead-time signal being in said active state.

18. The offline converter of claim 17, wherein said second switch circuit couples said second terminal of said second resistor to said ground terminal in response to said drive signal being in said active state.

19. A method of controlling a power factor of an offline converter comprising:
selectively switching an input line to a reference voltage terminal by providing a drive signal to a transistor;
measuring an output voltage generated by said selectively switching to form a feedback signal;
forming an error signal in response to said feedback signal;
multiplying said error signal and said drive signal to form a multiplied signal; and
pulse width modulating said drive signal with a duty cycle formed in response to said error signal; and
providing said drive signal further in response to said multiplied signal.

20. The method of claim 19, wherein said multiplying comprises:
modulating a first current in response to said error signal to form a modulated current signal;
providing said modulated current signal to a node;
selectively switching said node to said reference voltage terminal in response to said drive signal;
providing a second current from said node into an impedance network; and
forming a multiplied voltage based on said providing said second current from said node into said impedance network.

21. The method of claim 19, wherein said multiplying comprises:
buffering said error signal to form a buffered error signal;
selectively switching said buffered error signal to a first node in response to said drive signal;
dividing a voltage on said first node using a resistive divider having a first terminal coupled to said first node, and a second terminal coupled to said reference voltage terminal; and
forming said multiplied signal from an intermediate node of said resistive divider.

22. The method of claim 21, further comprising:
forming a skip signal in response to said multiplied signal; and
skipping said pulse width modulating in response to said skip signal.

\* \* \* \* \*